United States Patent [19]

Okita

[11] Patent Number: 4,855,852

[45] Date of Patent: Aug. 8, 1989

[54] MAGNETIC HEAD

[75] Inventor: Masao Okita, Furukawa, Japan

[73] Assignee: Alps Electric Co., Ltd., Japan

[21] Appl. No.: 201,317

[22] Filed: May 26, 1988

Related U.S. Application Data

[63] Continuation of Ser. No. 875,553, Jun. 18, 1986, abandoned.

[30] Foreign Application Priority Data

Jun. 26, 1985 [JP] Japan .................................. 60-95728

[51] Int. Cl.⁴ .......................... G11B 5/48; G11B 21/16
[52] U.S. Cl. .................................................... 360/104
[58] Field of Search ................................ 360/102–106, 360/110, 118, 121–122, 128–129

[56] References Cited

U.S. PATENT DOCUMENTS

| 2,923,780 | 2/1960 | Berman et al. | 360/129 |
| 3,846,837 | 11/1974 | Jacques | 360/129 X |
| 3,975,771 | 8/1976 | Lazzari | 360/104 |
| 4,110,804 | 8/1978 | Castrodale et al. | 360/118 |
| 4,475,281 | 10/1984 | Holocek | 360/104 X |
| 4,480,281 | 10/1984 | Cantwell | 360/104 |
| 4,633,352 | 12/1986 | Mizoguchi et al. | 360/104 |
| 4,647,998 | 3/1987 | Onohara et al. | 360/104 X |
| 4,651,243 | 3/1987 | Daste et al. | 360/104 |
| 4,658,315 | 4/1987 | Seki et al. | 360/104 |

FOREIGN PATENT DOCUMENTS

| 59-146478 | 8/1984 | Japan | 360/110 |
| 60-103507 | 6/1985 | Japan | 360/104 |

OTHER PUBLICATIONS

Castrodale et al., "Shield for Protecting Magnetic Head from Ambient AC and DC Magnetic Fields", IBM Tech. Disc. Bull., vol. 18, No. 7, Dec. 1975.

Primary Examiner—John H. Wolff
Attorney, Agent, or Firm—Guy W. Shoup; Paul J. Winters; Stephen L. Malaska

[57] ABSTRACT

A magnetic head has a head core and a slider integrally formed with the head core, and sidewardly projecting flanges formed on a near side of the magnetic head to be mounted against the back surface of a mounting plate for the magnetic recording/reproducing device. As a result, the height from the mount surfaces to a slide surface of the magnetic head does not vary when it is assembled on the recording/reproducing device.

4 Claims, 3 Drawing Sheets

MAGNETIC HEAD

This is a continuation application from application Ser. No. 875,553 filed June 18, 1986, now abandoned.

BACKGROUND OF THE INVENTION

This invention relates to a magnetic head employable for a magnetic recording/reproducing device for recording and reproducing information through a magnetic recording medium.

Conventionally, a substantially rectangular parallelepiped magnetic head shown in FIG. 5 is known as a magnetic head employable for a magnetic disc device for recording and reproducing information on a magnetic recording medium such as a so-called magnetic disc formed in a disclike shape.

Referring to FIGS. 5 to 7, the magnetic head 1 is constituted of a R/W core 2, erase cores 4 exposed at both sides near a R/W gap 3 of the R/W core 2, and a slider 5 made of ceramics and integrally bonded to the cores 2 and 4. The magnetic head 1 is formed with a slide surface 6 adapted to come into contact with a magnetic disc on an upper side as viewed in the drawing. The slide surface 6 is polished in a planar shape. The magnetic head 1 is further formed with a groove 7 at a central portion thereof and a mount surface 8 to be mounted to a magnetic disc device on a lower side opposite from the slide surface 6.

In the meantime, it is known that characteristics of the magnetic head are largely varied with the length and depth (d) of the gap 3. The length of the gap 3 is determined by the thickness of a spacer such as a glass plate to be utilized in assembling each of core members 2a, 2b and 2c of the R/W core 2 as shown in FIG. 7. The depth (d) of the gap is determined by polishing the formation side of the gap 3, after integrally forming the R/W core 2 and the erase cores 4 with the slider 5. In determination of the depth of the gap, the slide surface 6 is polished as the impedance of a coil 2d wound around the R/W core 2 is measured, and when the impedance corresponding to a predetermined depth of the gap is indicated, such polishing work is stopped to obtain the predetermined depth of the gap (d). Alternatively, the depth of the gap is measure during assembly of the core members 2a, 2b, and 2c, the R/W core and the erase cores 4 are integrally formed with the slider 5, and the slide surface 6 is polished by a grinding distance (1) until the predetermined depth (d) of the gap is obtained. In any case, since the R/W core 2 and the erase cores 4 are polished from the formation side of the gap 3, there occurs a problem of dispersion in integrally forming the R/W core 2 and the erase cores 4 with the slider 5.

In other words, since the R/W core 2 and the erase cores 4 are integrally formed with the slider 5 by bonding the former to the latter with the use of low-melting glass, the slide surface 6 of the slider 5 is not always flush with the surface on the formation side of the gap 3 of the cores 2 and 4, and a slight unevenness is usually formed on the slide surface 6 before polishing. Therefore, when the slide surface 6 is polished to the predetermined depth (d) on the basis of the plane on the formation side of the gap 3 of the cores 2 and 4 (the cores 2 and 4 and the slider 5 are always formed taking into consideration the grinding distance, the height of the magnetic head 1 resultingly coincides with the height H of the slide surface 6 with respect to the mount surface. However, owing to the fact that the height H coincides with a height of the slider 5, if the height of the cores 2 and 4 is greater than that of the slider 5 after bonding, the extent of polishing of the slider 5 is reduced, thereby causing an increase in the height H. If the height of the cores 2 and 4 is smaller than that of the slider 5 after bonding, the extent of polishing of the slider 5 is increased, thereby causing a decrease in the height H. Thus, the variation generated in assembling the magnetic head 1 results in dimensional error in height which always appears in a product.

Further, as the mount surface 8 is formed on a side opposite from, the formation side of the gap 3, it is brought into contact with a mount plate 11 for the magnetic head 1 mounted to an upper side (in the drawing) of a carriage 9 at a mount portion 10 formed through the carriage 9, and fixed to the mount plate 11 by an adhesive material 17 or the like. Further, as the R/W core 2 and the coil 2d wound around the R/W core 2 are projected from the mount surface 8 side of the magnetic head 1, the mount plate 11 is required to be formed with an opening 12 for permitting the R/W core 2 to be loosely inserted therethrough. Thus, in the case that the mount surface 8 is formed on a back side with respect to the R/W gap 3 of the magnetic head 1, mounting the magnetic head 1 to the mount plate 11 is rendered complicated and presents a problem in assembling operation.

In addition, when the magnetic head 1 is mounted to the mount plate 11, variation in thickness of the mount plate 11 is added to the error in height of the magnetic head 1, and as a result, it is difficult to secure the position of the gap 3 within a predetermined tolerance, thus causing deterioration of recording/reproducing characteristics.

Furthermore, in such a conventional mounting structure as mentioned above, a shield plate 13 is wound at a peripheral portion of the magnetic head 1 after the magnetic head 1 is mounted to the mount plate 11. Although a shield effect may be enhanced by the structure, there occurs the problem that distinct parts are required and assembling steps are increased.

SUMMARY OF THE INVENTION

It is a first object of the present invention to provide a magnetic head which may eliminate variation in height from a mount portion to a slide surface thereby to prevent deterioration of recording/reproducing characteristics.

It is a second object of the present invention to provide a magnetic head which may be easily mounted to a magnetic disc device thereby to improve operation efficiency.

It is a third object of the present invention to provide a magnetic head which may be assembled with a reduced number of parts and a reduced number of assembling steps thereby to contribute to reduction in cost.

According to the present invention, there is provided a magnetic head having a head core and a slider integrally formed with said head core, said magnetic head comprising sidewardly projecting flanges formed on a mount side of said magnetic head to be mounted to a magnetic recording/reproducing device, and mount surfaces formed on a magnetic recording medium side of said flanges, wherein the height from said mount surfaces to a slide surface of said magnetic head will not vary when said magnetic head is mounted through said mount surfaces to said magnetic recording/reproducing device.

In one aspect of the invention, the mount surface is brought into contact with the surface of a mounting plate on the opposite side from the magnetic disc, and is mounted thereto, so as to eliminate the height variation due to the thickness of the mounting plate and maintain a constant height from the mount surfaces to the slide surface. Further, the magnetic head is inserted from the back side of the mount plate with respect to the magnetic disc on the front side thereof.

The invention will be more fully understood from the following detailed description and appended claims when taken with the drawings.

DETAILED DESCRIPTION OF THE PREFERRED EMBODIMENTS

Figure 1:
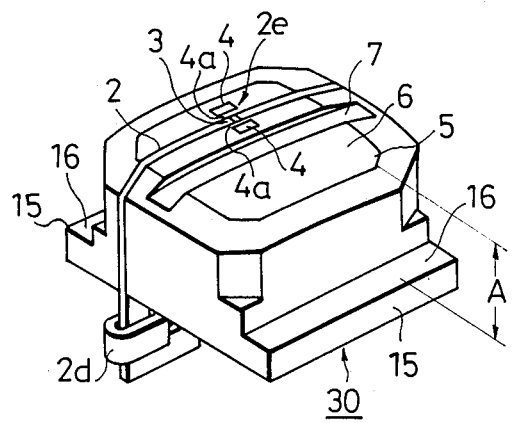
FIG. 1 is a perspective view of a magnetic head of a first preferred embodiment according to the invention.
Figure 5:
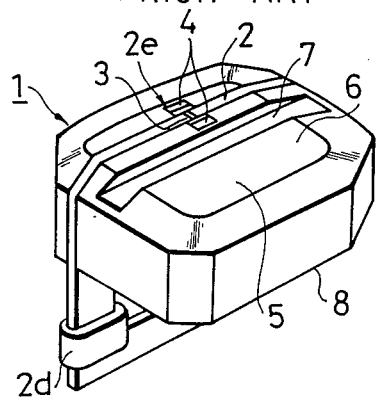
FIG. 5 is a perspective view of the magnetic head in the prior art.
Figure 6:
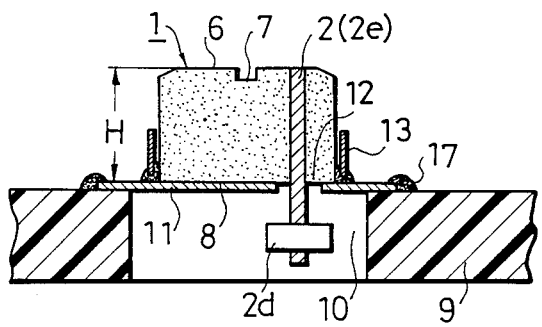
FIG. 6 is a sectional view showing a method of mounting the magnetic head to the carriage of the magnetic disc device in the prior art.
Figure 7:
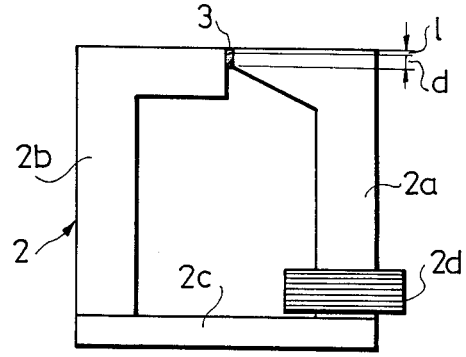
FIG. 7 is an elevational view of the R/W core in the prior art.

Referring to FIG. 1 in which identical or similar members are designated by the same reference numerals as in FIGS. 5 to 7, a magnetic head 30 is primarily constituted of a head core 2e having a R/W core 2 and erase cores 4 and a slider 5 integrally formed with the head core 2e in such a manner as to hold the same. A slide surface 6 formed on an upper side of the magnetic head 30 as viewed in the drawing is polished in a planar shape, and a R/W gap 3 is exposed. Each of erase gaps 4a is formed between each the erase cores 4 and the R/W core 2, and an air bleeding groove 7 is formed at a central portion of the slide surface 6. The magnetic head 30 is formed with flanges 15 projecting in parallel to a sliding direction of a magnetic disc at a base portion thereof which is formed on a back side with respect to the slide surface 6. The flanges 15 are formed with mount surfaces 16 polished in parallel to the slide surface 6 on the slide surface 6 side in such a manner that the distance from the slide surface 6 to the mount surfaces 16 is kept constant. An outer peripheral portion of the slide surface 6 and each angular portions of the magnetic head 30 are chamfered.

Figure 2:
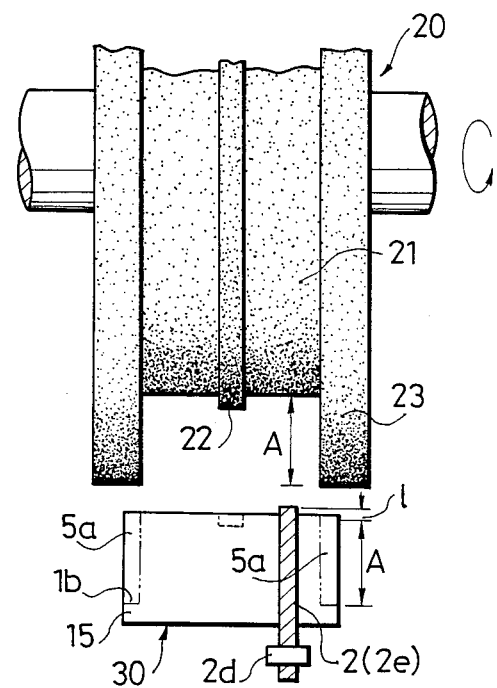
FIG. 2 is an illustration showing a method of forming the mount surface of the magnetic head.

The mount surfaces 16 are formed on the upper side of the flanges 15 in the drawings. Referring to FIG. 2, a grinding wheel 20 is constituted of a slide surface polishing wheel member 21, a groove forming wheel member 22 and amount surface forming wheel member 23 (which simultaneously forms the flanges 15). The difference in radii of the slide surface polishing wheel member 21 and the mount surface forming wheel member 23 is made equal to a desired height A from the mount surfaces 16 to the slide surface 6, and the slider 5 integrally formed with the head core 2e is ground from the slide surface 6 side. When the slider 5 is ground by a predetermined grinding distance (1) from the slide surface 6 side, that is, the gap formation side of the R/W core 2 by the method similar to that in the prior art, a predetermined depth (d) of the gap of the R/W core 2 may be obtained. In this step, side portions 5a of the slider 5 are cut out by the mount surface forming wheel member 23, and the flanges 15 as a residual portion are formed on the base side of the magnetic head 30, thereby forming the mount surfaces 16 on the upper surface side (in the drawing) of the flanges 15. Since the difference in radii of the slide surface polishing wheel member 21 and the mount surface forming wheel member 23 is set to the height A, a distance between the slide surface 6 and the mount surface 16 is made equal to the height A irrespective of variations in the bonding of the head core 2e to the slider 5. Accordingly, when the mount surface 16 is used as a reference plane in mounting the magnetic head 30 to the magnetic disc device, the position of the gap 3 from the reference plane (mount surface 16) may be maintained constant at all times.

Figure 3:
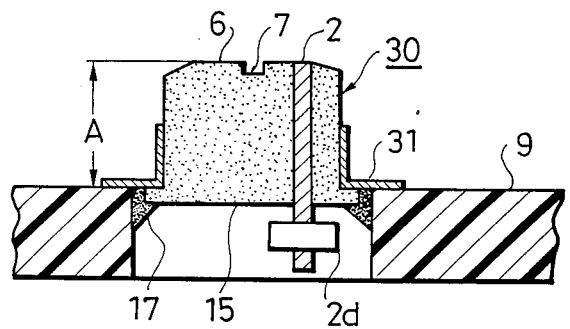
FIG. 3 is a sectional view showing a method of mounting the magnetic head to the carriage of the magnetic disc device.

The magnetic head 30 as mentioned above is mounted to the magnetic disc device in the following manner for example. As shown in FIG. 3, a mounting plate 31 of an L-shape is bonded to an upper surface side (in the drawing) of a carriage 9 at a mount portion 10 of the magnetic head 30. Then, the magnetic head 30 is inserted from a lower surface side of the mounting plate 31 into a hole of the mounting plate 31 inwardly projecting from a circumferential edge portion of the mount portion 10, and the mount surfaces 16 are brought into contact with the lower surface of a circumferential edge portion of the hole of the mounting plate 31. Then, the magnetic head 30 is fixed to the mounting plate 31 by an adhesive material 17 or the like.

With this mount structure, the position of the gap 3 of the magnetic head 30, that is, the height of the slide surface 6 from the carriage 9 is rendered equal to the predetermined height A when the lower surface of the mount plate 31 is defined as a reference plane, and error in the height from the carriage 9 for every magnetic head 30 is eliminated to obtain a uniform height. In this case, variation in thickness of the mounting plate 31 has no influence upon the height A.

Further, the magnetic head 30 is inserted from the lower surface side of the mounting plate 31, and the flanges 15 of the magnetic head 30 are mounted to the mounting plate 31. Therefore, the magnetic head 30 may be more easily assembled irrespective of the presence of the head core 2e as compared with the more difficult prior art method where the opening 12 is formed through the mounting plate 11 so as to loosely insert the head core 2e therethrough.

Further, as the back side of the magnetic head 30 is fully opened even after the magnetic head 30 is mounted to the mounting plate 31, a lead wire may be easily connected to the magnetic head 30.

Moreover, as the mounting plate 31 is formed in a burring shape, a shield effect may be obtained by the mounting plate 31 itself without especially providing the shield plate 13 thereby reducing the number of parts. Further, as the invention does not require the step of winding and bonding the shield plate 13 around the magnetic head, the number of assembling steps may be reduced to attain cost reduction.

Figure 4:
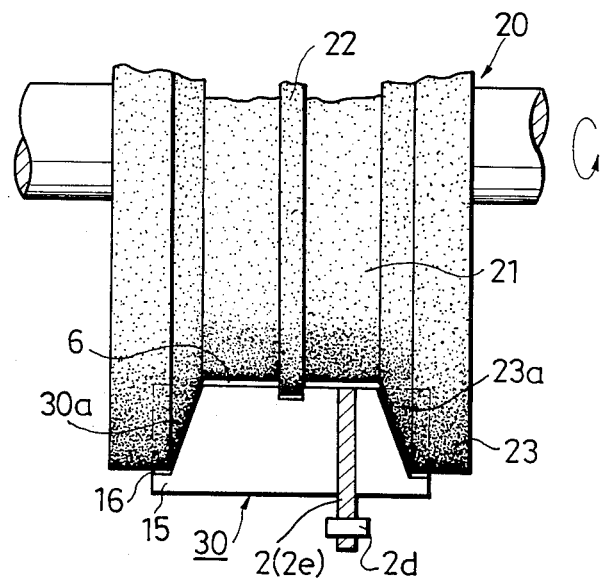
FIG. 4 is an illustration showing a method of forming the magnetic head of a second preferred embodiment according to the invention.

Referring next to FIG. 4 which shows a second preferred embodiment, end surfaces 30a of the magnetic head 30 on the slider 5 side are formed in a tapered manner by using a grinding wheel 20 provided with a mount surface forming wheel member 23 having tapered side surfaces 23a. As compared with the grinding method shown in FIG. 2, the second preferred embodiment may make the grinding work easier. The other structure is identical with that of the first preferred embodiment except that the end surfaces 30a of the magnetic head 30 are tapered.

According to the grinding methods of the magnetic head 30 as mentioned in the first and second preferred embodiments, polishing of the slide surface 6 to the predetermined depth (d) of the gap and formation of the mount surface 16 may be carried out in a single step without variation. Therefore, the invention is greatly effective in reducing cost and increasing the accuracy of parts.

In addition, although the preferred embodiments of the invention show a straddle type head core 2e, the invention is applicable regardless of the type of head core 2e.

Having thus described the preferred embodiment of the invention, it should be understood that numerous structural modifications and adaptations may be made without departing from the spirit of the invention.

What is claimed is:

1. In a structure for mounting a magnetic head to a mounting member of a magnetic recording/reproducing device, in which the magnetic head has a planar front slide surface integrally formed with a head core facing in contact with a magnetic recording medium oriented in a lateral direction, and a rear mounting part of the magnetic head is mounted to the mounting member, the improvement comprising:

said mounting member having a mounting hole formed therethrough and a laterally extending surface around the mounting hole on a front side facing toward the recording medium;

said rear mounting part including a pair of flanges extending laterally on opposite sides of the magnetic head from each other, said flanges each having a mounting surface extending parallel to the lateral direction on their sides facing toward the recording medium, each mounting surface being formed a given distance from the front slide surface of the magnetic head in a reference mounting plane;

a pair of mounting plates mounted on the laterally extending surface of the mounting member extending laterally partially across the hole on each side of the hole opposite from each other; and said magnetic head being mounted in the hole and adhered from a rear side of the mounting member such that the mounting surfaces of the flanges are held as the reference mounting plane in contact with the respective mounting plates extending laterally partially across the hole, whereby the slide surface of the mounted magnetic head is accurately located by the given distance above the lateral surface of the mounting member.

2. The magnetic head as defined in claim 1, wherein lateral at an acute angle surfaces of said magnetic head are formed tapered toward said recording medium.

3. The magnetic head as defined in claim 1, wherein said mounting plates provide a shield effect to shield said magnetic recording/reproducing device from said head.

4. The magnetic head as defined in claim 1, wherein a back side of said magnetic head with respect to said slide surface is fully exposed through said hole.

* * * * *

UNITED STATES PATENT AND TRADEMARK OFFICE
CERTIFICATE OF CORRECTION

PATENT NO. : 4,855,852
DATED : August 8, 1989
INVENTOR(S) : Masao Okita

It is certified that error appears in the above-identified patent and that said Letters Patent is hereby corrected as shown below:

On the title page:

Title

Should read -- "Mounting Structure For Magnetic Head" --

Abstract

Line 3, "near" should read -- rear --.

Claim 2

Should read -- The magnetic head as defined in claim 1, wherein lateral surfaces of said magnetic head are formed at an acute angle tapered toward said recording medium. --

Signed and Sealed this

Twenty-second Day of May, 1990

Attest:

HARRY F. MANBECK, JR.

*Attesting Officer*    *Commissioner of Patents and Trademarks*